(12) United States Patent
Sugaya

(10) Patent No.: US 10,435,051 B1
(45) Date of Patent: Oct. 8, 2019

(54) SYSTEM, METHOD, AND PROGRAM FOR PREVENTING ACCIDENTS

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/566,767

(22) PCT Filed: Dec. 28, 2016

(86) PCT No.: PCT/JP2016/089192
§ 371 (c)(1),
(2) Date: Oct. 16, 2017

(87) PCT Pub. No.: WO2018/123053
PCT Pub. Date: Jul. 5, 2018

(51) Int. Cl.
*B61L 23/00* (2006.01)
*B61B 1/02* (2006.01)
(Continued)

(52) U.S. Cl.
CPC ............... *B61L 23/00* (2013.01); *B61B 1/02* (2013.01); *G06K 9/00369* (2013.01);
(Continued)

(58) Field of Classification Search
CPC ....... B61L 23/00; B61B 1/02; G06K 9/00369; G06K 9/00771
See application file for complete search history.

(56) References Cited

U.S. PATENT DOCUMENTS

| | | | |
|---|---|---|---|
| 7,832,691 B2 * | 11/2010 | Reibeling | B61L 29/32 246/113 |
| 8,998,148 B2 * | 4/2015 | Parida | B61L 23/00 246/111 |

(Continued)

FOREIGN PATENT DOCUMENTS

| | | |
|---|---|---|
| JP | 08-180276 | 7/1996 |
| JP | 09-026472 | 1/1997 |

(Continued)

*Primary Examiner* — Jason C Smith
(74) *Attorney, Agent, or Firm* — Lex IP Meister, PLLC

(57) ABSTRACT

The present invention provides a system for preventing an accident that minimizes the number of monitor devices and prevents a collision accident to reduce the work and cost burdens. The system for preventing an accident 1 of the present invention includes an imaging device 10, a monitor server 20, and a warning device 60. The control unit 30 of the monitor server 20 executes the area receiving module 31 to receive input of an approach area as an area where a vehicle approaches and a danger area where is danger from an approaching vehicle based on a base image taken by the imaging device 10. The control unit 30 executes the time period judgment module 33 to judge whether or not it is a time period when a vehicle enters the approach area. If a vehicle enters the approach area, the control unit 30 executes the second judgment module 35 to judge whether or not a person, etc., enters the approach area or the danger area. If a person, etc., enters the approach area or the danger area, the control unit 30 executes the warning module 36 to instruct the warning device 60 to provide warning information.

5 Claims, 5 Drawing Sheets

(51) Int. Cl.
*G06K 9/00* (2006.01)
*G06T 7/20* (2017.01)

(52) U.S. Cl.
CPC ............ *G06K 9/00771* (2013.01); *G06T 7/20* (2013.01); *G06T 2207/30236* (2013.01)

(56) References Cited

U.S. PATENT DOCUMENTS

| | | | | |
|---|---|---|---|---|
| 9,019,115 B2* | 4/2015 | Ballinger | ................ | B61L 29/24 |
| | | | | 246/292 |
| 2005/0184883 A1* | 8/2005 | Graham | ................ | B61L 29/28 |
| | | | | 340/917 |
| 2006/0261219 A1* | 11/2006 | Sharkey | ................ | B61L 29/30 |
| | | | | 246/473.1 |
| 2007/0084974 A1* | 4/2007 | Sharkey | ................ | B61L 29/32 |
| | | | | 246/473.1 |
| 2008/0185482 A1* | 8/2008 | Ghigliotti | ................ | E01C 9/04 |
| | | | | 246/473.1 |
| 2011/0084176 A1* | 4/2011 | Reichelt | ................ | B61L 23/041 |
| | | | | 246/473.1 |
| 2011/0108677 A1* | 5/2011 | Asuka | ................ | B61L 23/14 |
| | | | | 246/27 |
| 2013/0193275 A1* | 8/2013 | Baines | ................ | B61L 29/00 |
| | | | | 246/111 |
| 2013/0200223 A1* | 8/2013 | Alexander | ................ | B61L 29/28 |
| | | | | 246/473.1 |
| 2014/0339374 A1* | 11/2014 | Mian | ................ | G08G 1/0175 |
| | | | | 246/473.1 |
| 2014/0361125 A1* | 12/2014 | Fries | ................ | B61L 29/04 |
| | | | | 246/473.1 |
| 2014/0361126 A1* | 12/2014 | Steffen | ................ | B61L 29/22 |
| | | | | 246/473.1 |

FOREIGN PATENT DOCUMENTS

| | | |
|---|---|---|
| JP | 10-341427 | 12/1998 |
| JP | 2001-341642 | 12/2001 |
| JP | 2002-29421 | 1/2002 |
| JP | 2016-162383 | 9/2016 |

* cited by examiner

TIME SCHEDULE TABLE

| Type | Arrival time | Departure time | Speed to platform | Remarks |
|---|---|---|---|---|
| Local | 6:00 | 6:02 | 40 km/h | |
| Rapid | 6:15 | 6:17 | 40 km/h | |
| Express | 6:25 | 6:27 | 40 km/h | |
| Limited express | 6:30 | 6:30 | 80 km/h | Passing |
| Local | 6:40 | 6:42 | 40 km/h | |
| ⋮ | ⋮ | ⋮ | ⋮ | ⋮ |

FIG. 5

SYSTEM, METHOD, AND PROGRAM FOR PREVENTING ACCIDENTS

TECHNICAL FIELD

The present invention relates to a system, a method, and a program for preventing an accident.

BACKGROUND ART

In the past, various systems that prevent the accident in which a vehicle collides with a person or an animal from occurring were proposed. However, to prevent the accident, it is ineffective to always monitor the surroundings even if no vehicles are near there.

As a system that switches the operations of the detection means (sensor unit group) based on whether or not an arrival notification is received, for example, the object detection system including: a detection means (sensor unit group) that is arranged along the course where the vehicle runs to detect an object in a predetermined section of the course; a detection part that acquires the detection result from the detection means and outputs the presence or absence of an object; a mode control part that switches the start mode of the detection means between a first mode and a second mode in which power consumption of the detection means is less than that in the first mode; and a course controller that outputs a switch instruction to the mode control part based on whether or not an arrival notification showing that the vehicle has arrived at a predetermined point has been received is proposed (refer to Patent Document 1).

According to this system, the power consumption of the detection means (sensor unit group) is reduced so that the power-supply unit to feed power to an objection monitor sensor can be prevented from increasing in capacity and from increasing the area of the installation site even if the sensors are increased to monitor a larger section of the course.

CITATION LIST

Patent Literature

Patent Document 1: JP 2016-162383A

SUMMARY OF INVENTION

However, the system described in Patent Document 1 should arrange a number of sensor units that monitor the presence or absence of an object that may obstruct the running of a vehicle in a predetermined monitor section on a course. Therefore, from viewpoints of the work and cost burdens, a system that is capable to minimize the number of devices that monitor the presence or absence of an object and maximize the effectiveness in preventing a collision accident has been demanded.

In view of such demand, an objective of the present invention is to provide a system for preventing an accident that is capable to minimize the number of devices that monitor the presence or absence of an object and maximize the effectiveness in preventing a collision accident in light of the work and cost burdens.

The first aspect of the present invention provides a system for preventing an accident including:

an area receiving unit that receives input of an approach area as an area where a vehicle approaches and a danger area as an area where is danger from an approaching vehicle based on an image;

a time period judgment unit that judges whether or not it is a time period when the vehicle enters the approach area by referring to the schedule of the vehicle;

a second judgment unit that judges whether or not a person and/or an animal enters the approach area and/or the danger area if the time period judgment unit judges that it is a time period when the vehicle enters the approach area; and a warning unit that provides warning information if the second judgment unit judges that a person and/or an animal enters the approach area and/or the danger area.

According to the first aspect of the present invention, the area receiving unit receives input of an approach area as an area where a vehicle approaches and a danger area as an area where is danger from an approaching vehicle based on an image, the time period judgment unit judges whether or not it is a time period when the vehicle enters the approach area by referring to the schedule of the vehicle, the second judgment unit judges whether or not a person, etc., enters the input approach area and/or danger area if it is a time period when the vehicle enters the approach area, and the warning unit provides warning information if a person, etc., enters the approach area and/or the danger area.

Accordingly, establishment of the standards of an approach area and a danger area in an image through the input that the area receiving unit receives can fix one or two places to be imaged to minimize the number of devices that monitor the presence or absence of an object (person and/or animal). Furthermore, since the second judgment unit judges whether or not a person, etc., enters the approach area and/or the danger area if it is a time period when a vehicle enters the approach area, and the warning unit provides warning based on the judgment result from the second judgment unit, the accident in which a vehicle collides with an object (person or animal) can be prevented.

Therefore, the first aspect of the present invention can provide a system for preventing an accident that is capable to minimize the number of devices that monitor the presence or absence of an object and maximize the effectiveness in preventing a collision accident and consequently reduce the work and cost burdens.

The second aspect of the present invention provides the system according to the first aspect of the present invention, further including a first judgment unit that judges whether or not the vehicle enters the approach area based on an image, in which the second judgment unit judges whether or not a person and/or an animal enters the approach area and/or the danger area if the first judgment unit judges that the vehicle enters the approach area.

According to the second aspect of the present invention, the second judgment unit judges whether or not a person, etc., enters the approach area and/or the danger area if a vehicle actually enters the approach area. Therefore, the operation error of the second judgment unit that is caused by the disruption of the vehicle schedule can be prevented.

The third aspect of the present invention provides the system according to the second aspect of the present invention, further including a determination unit that determines a just-approaching area as an area where the vehicle enters in an early stage within the approach area, in which the first judgment unit judges whether or not the vehicle enters the just-approaching area to judge that the vehicle enters the approach area.

According to the third aspect of the present invention, the first judgment unit can judge that the vehicle enters the approach area at an early stage of when a vehicle is about to enter a danger area for a person, etc. As the result, the judgement of the second judgment unit and the waring from the warning unit can be accelerated. Specifically, the warning unit can provide warning information before the whole of a vehicle enters a danger area for a person, etc. Therefore, the second aspect of the present invention can further enhance the effectiveness in preventing a collision accident even if the number of devices that monitor the presence or absence of an object is minimized.

The fourth aspect of the present invention provides the system according to the third aspect of the present invention, in which the determination unit determines the just-approaching area from an image taken in an early stage of when the vehicle enters.

According to the fourth aspect of the present invention, the just-approaching area can be surely determined within an area where a vehicle is about to enter a danger area for a person, etc. Specifically, the warning unit can provide warning information before the whole of a vehicle enters a danger area for a person, etc. Therefore, the fourth aspect of the present invention can further enhance the effectiveness in preventing a collision accident even if the number of devices that monitor the presence or absence of an object is minimized.

The fifth aspect of the present invention provides the system according to the third or the fourth aspect of the present invention, in which the determination unit determines the just-approaching area based on the speed at which the vehicle enters the approach area.

According to the fifth aspect of the present invention, the just-approaching area can be determined in an earlier stage if the speed at which the vehicle enters the approach area is high. As the result, the warning unit can be prevented from providing warning information after the whole of a vehicle enters the danger area for a person, etc., because of the high speed at which the vehicle enters the approach area.

Furthermore, the just-approaching area can be determined in a later stage if the speed at which a vehicle enters the approach area is low. As the result, the warning unit can be prevented from providing false information because a vehicle is about to approach the just-approaching area but actually is not in the danger area for a person, etc.

Therefore, the fifth aspect of the present invention can further improve the accuracy of warning information provided from the warning unit even if the number of devices that monitor the presence or absence of an object is minimized.

The sixth aspect of the present invention provides the system according to any one of the first to the fifth aspects of the present invention, further including a danger area change unit that changes the danger area that the area receiving unit received based on the speed at which the vehicle enters the approach area.

According to the sixth aspect of the present invention, the danger area that the area receiving unit received can be temporarily changed to a larger area if a vehicle that has a higher speed than any other vehicles that have entered the approach area enters the approach area. As the result, the warning unit can be prevented from providing warning information after the whole of a vehicle enters the danger area for a person, etc., because of the high speed at which the vehicle enters the approach area.

Furthermore, the danger area that the area receiving unit received can be temporarily changed to a smaller area if a vehicle that has a lower speed than any other vehicles that have entered the approach area enters the approach area. As the result, the warning unit can be prevented from providing false information because the vehicle approaches around the danger area but actually is not in the danger area for a person, etc.

Therefore, the sixth aspect of the present invention can further improve the accuracy of warning information provided from the warning unit even if the number of devices that monitor the presence or absence of an object is minimized.

The present invention can provide a system for preventing an accident that minimizes the number of devices that monitor the presence or absence of an object and maximize the effectiveness in preventing a collision accident and contributes to reduce the work and cost burdens.

BRIEF DESCRIPTION OF DRAWINGS

FIG. 5 shows an example of the time schedule table 52 according to the embodiment.

DESCRIPTION OF EMBODIMENTS

Embodiments of the present invention will be described below with reference to the attached drawings. However, these are illustrative only, and the technological scope of the present invention is not limited thereto.

CONFIGURATION OF SYSTEM FOR PREVENTING AN ACCIDENT 1

Figure 1:
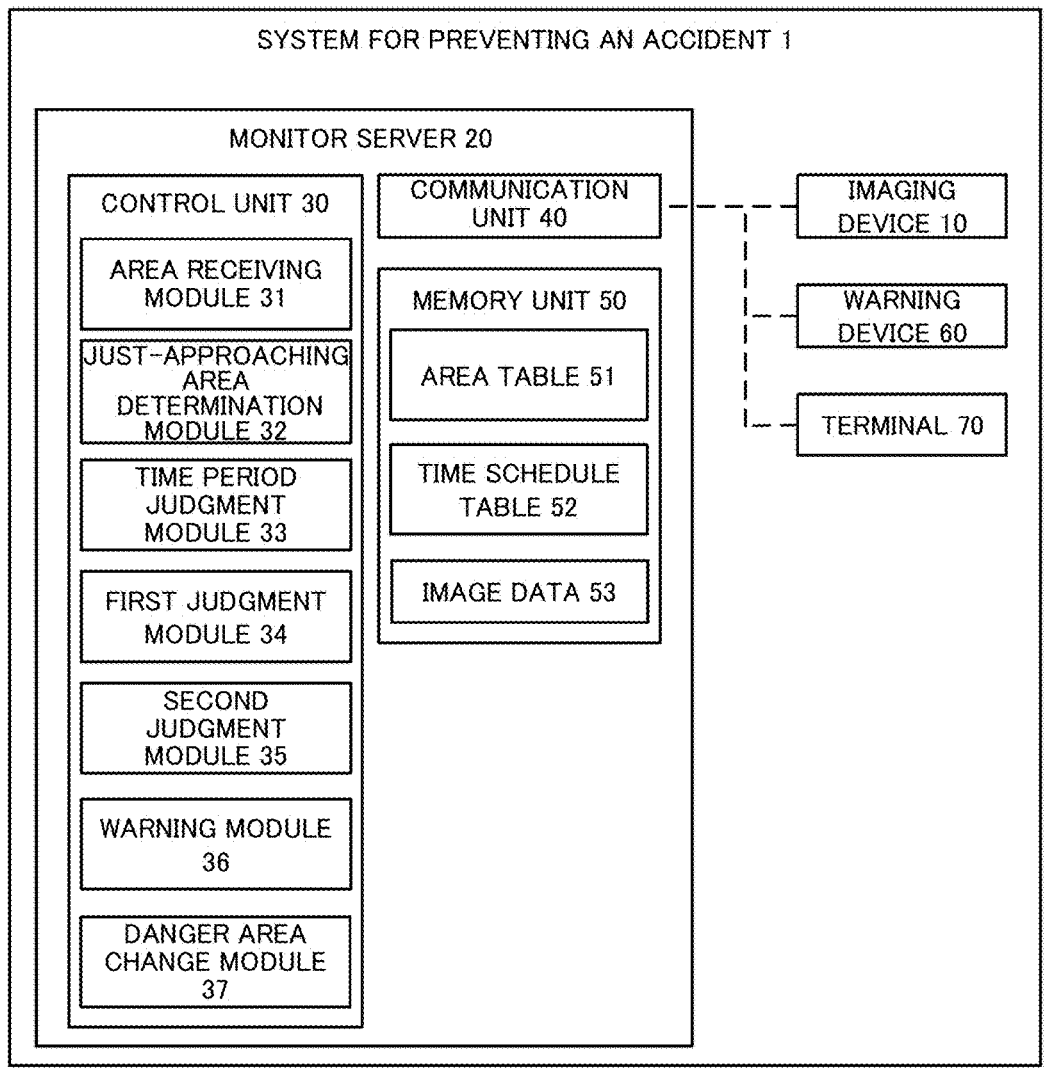
FIG. 1 shows a block diagram illustrating a hardware configuration and a software function of the system for preventing an accident 1 in an embodiment.

FIG. 1 shows a block diagram illustrating a hardware configuration and a software function of the system for preventing an accident 1 in an embodiment.

The system for preventing an accident 1 includes an imaging device 10 that is previously placed to take an image of, for example, the entrance of a vehicle and the presence or absence of a person and/or an animal in an area where a vehicle enters; a monitor server 20 that monitors, for example, the entrance of a vehicle and the presence or absence of a person, etc., from an image taken by the imaging device 10; a warning device 60 that provides warning information based on the monitoring result from the monitor server 20 as required; and a terminal 70 that inputs information to the monitor server 20. The imaging device 10, the monitor server 20, the warning device 60, and the terminal 70 are connected through a network.

In this embodiment, the vehicle is a railway vehicle, and the accident between a railway vehicle and a person or an animal is prevented when the railway vehicle comes into a station. However, the present invention is not limited to this case.

For example, the accident between a railway vehicle and a person or an animal may be prevented when the railway vehicle comes into a crossing.

Furthermore, for example, the vehicle may be a car or a motorcycle, and the accident between a car or a motorcycle and a person or an animal may be prevented when the car or the motorcycle comes into an intersection or runs on a straight road.

Furthermore, for example, the vehicle may be an airplane, and then the accident between an airplane and a bird (bird-strike) may be prevented when the airplane taxies on a runway or flies.

Furthermore, for example, the vehicle may be a vessel, and then the accident between a vessel and a large animal (e.g., whale) may be prevented when the vessel sails the sea.

The case where the vehicle is a railway vehicle, and the accident between a railway vehicle and a person or an animal is prevented when the railway vehicle comes into a station will be described below.

Imaging Device 10

The imaging device 10 is previously placed to image a predetermined section before a railway vehicle comes into a station.

The resolution of an image taken by the imaging device 10 is not limited in particular as long as the entrance of a vehicle and the presence or absence of a person and/or an animal in an area where a vehicle enters can be discerned.

The imaging device 10 is preferably capable to measure the approaching speed of a vehicle from an image. If the approaching speed of a vehicle can be measured from an image, the imaging device 10 may be provided with a continuous shooting function to take two or more still images per second or may be to take a moving image.

The imaging device 10 may also be provided with a visible camera and an infrared camera. This enables the imaging device 10 to take an image with a visible camera during day and with an infrared camera during night. Therefore, the accuracy of discerning the entrance of a vehicle and the presence or absence of a person and/or an animal in an area where a vehicle enters can be improved.

Monitor Server 20

The monitor server 20 at lease includes a control unit 30 to control data, a communication unit 40 to communicate with other devices, and a memory unit 50 to store data.

The control unit 30 includes a central processing unit (hereinafter referred to as "CPU"), a random access memory (hereinafter referred to as "RAM"), and a read only memory (hereinafter referred to as "ROM").

The communication unit 40 includes a device that is communicative to other devices, such as a Wireless Fidelity (Wi-Fi®) enabled device complying with, for example, IEEE 802.11.

The control unit 30 reads a predetermined program to achieve an area receiving module 31, a just-approaching area determination module 32, a time period judgment module 33, a first judgment module 34, a second judgment module 35, a warning module 36, and a danger area change module 37.

The memory unit 50 is to store data and files and includes a data storage unit such as a hard disk, a semiconductor memory, a record medium, or a memory card. The memory unit 50 stores the area table 51 and the time schedule table 52 that are to be described later.

The image taken by the imaging device 10 transmits to the monitor server 20 through the communication unit 40. The image transmitted from the imaging device 10 to the monitor server 20 is stored in the memory unit 50 as image data 53.

Warning Device 60

The monitor server 20 is connected with the warning device 60 through a network.

The warning device 60 is not limited in particular as long as providing warning information to a person and/or an animal, a station attendant, and a passenger who waits for a railway vehicle on the platform when it is confirmed that the person and/or the animal is present in the area where a vehicle enters.

Examples of the function of the warning device 60 include sounding the siren and notifying warning information to the manager (e.g., platform manager, headquarter manager) or to the driver and the conductor of a railway vehicle.

Terminal 70

The monitor server 20 is connected with the terminal 70 through a network.

The type of the terminal 70 is not limited in particular as long as the terminal 70 can transmit input information to the monitor server 20 and display information obtained from the monitor server 20 on the screen. Examples of the terminal 70 include computer devices such as a personal computer, a tablet terminal, and a smart phone.

Flow Chart Illustrating how to Prevent an Accident by Using the System for Preventingan Accident 1

Figure 2:
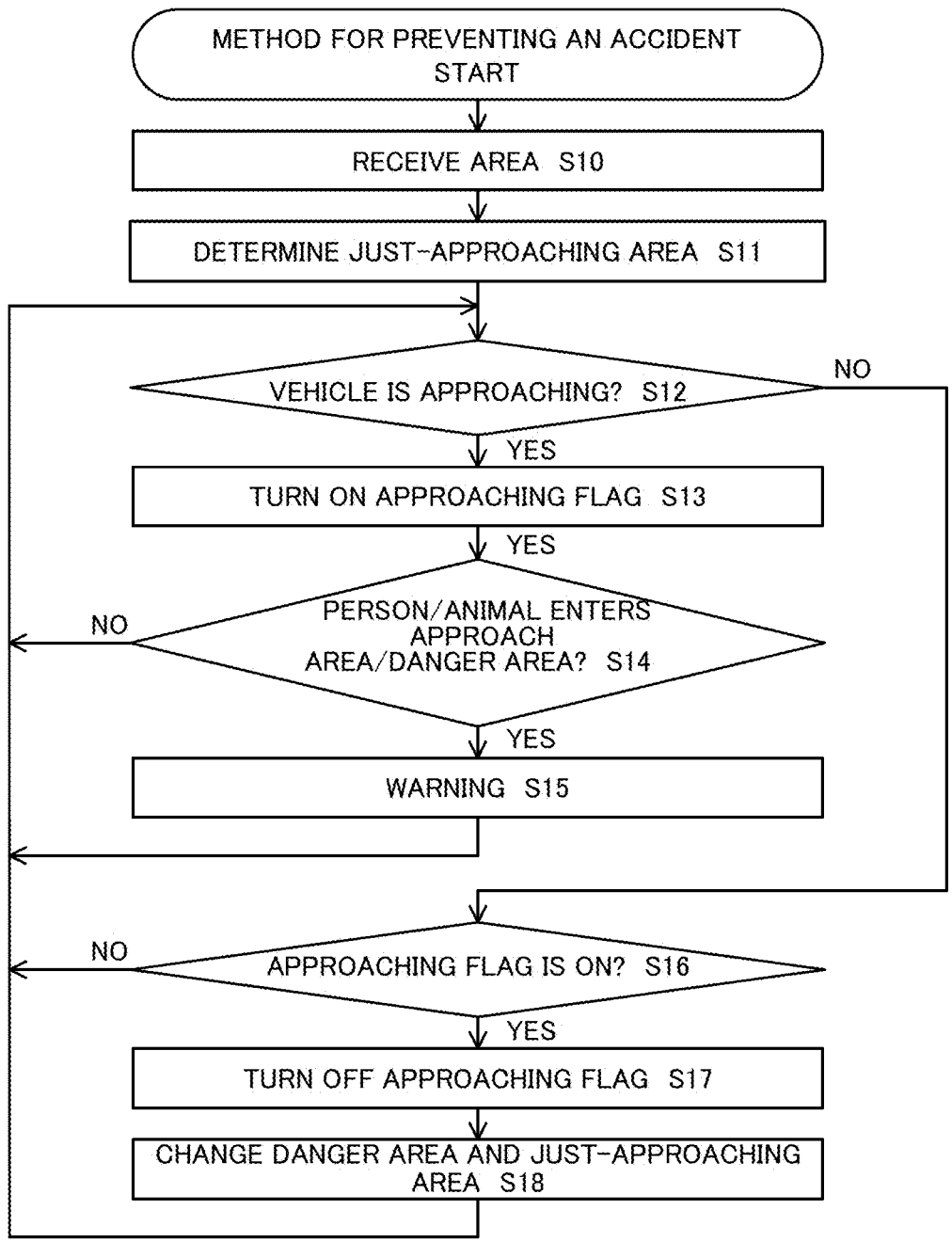
FIG. 2 shows a flow chart illustrating how to prevent an accident in the embodiment.

FIG. 2 shows a flow chart illustrating how to prevent an accident by using the system for preventing an accident 1. The tasks executed by the modules of the above-mentioned hardware and software will be described below.

Step S10: Receiving an Area

First, the control unit 30 of the monitor server 20 executes the area receiving module 31 to receive input of an approach area as an area where a vehicle approaches and a danger area as an area where is danger from an approaching vehicle based on a base image taken by the imaging device 10 fixed to a predetermined position and stored in the memory unit 50 as image data 53.

Figure 3:
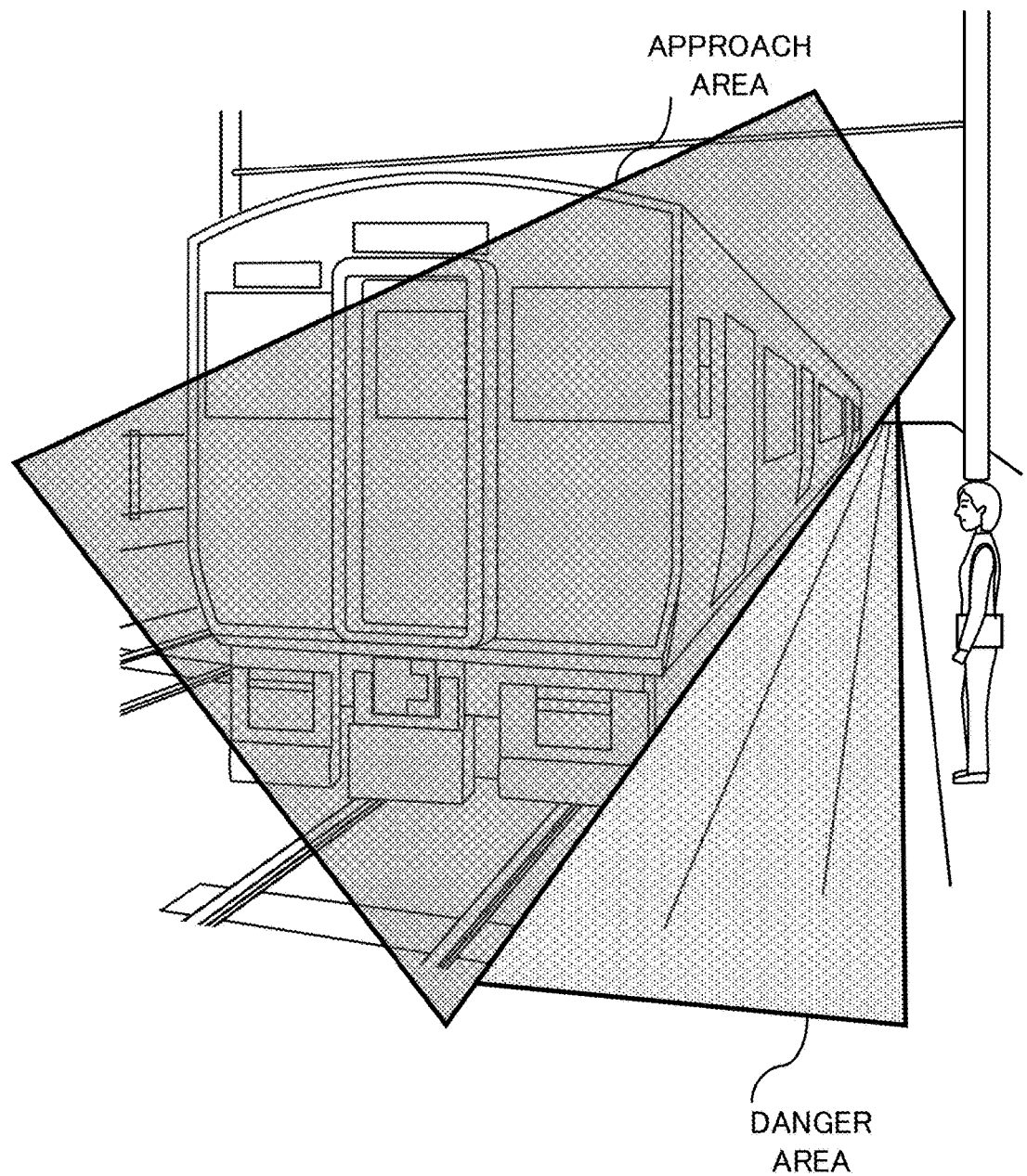
FIG. 3 shows a pattern diagram illustrating how to specify an approach area and a danger area from an image taken by the imaging device 10.

FIG. 3 shows a pattern diagram illustrating how to specify an approach area and a danger area from an image taken by the imaging device 10. The imaging device 10 is placed in a platform and configured to take an image of a railway vehicle from after it is about to approach the platform to before it stops at the platform.

Since a railway vehicle runs on a railway track, a railway track corresponds to an approach area. The control unit 30 of the monitor server 20 receives input of the area on the railway track as an approach area from a base image taken by the imaging device 10.

In a platform, the inside (near a railway track) from the white line and the yellow line is dangerous, which corresponds to a danger area. The control unit 30 of the monitor server 20 receives input of the area of the inside from the white line and the yellow line as a danger area from a base image taken by the imaging device 10.

The approach area and the danger area may be specified manually from the terminal 70 by an administrator or automatically from the image analysis function by the control unit 30.

The approach area and the danger area are stored in the area table 51 of the memory unit 50. How to specify the areas are not limited in particular. For example, the areas are specified as a pixel value (X-Y coordinate) of the image.

Step S11: Determining a Just-Approaching Area

The control unit 30 of the monitor server 20 executes the just-approaching area determination module 32 to determine a just-approaching area as an area where a vehicle enters in an early stage within the approach area received in the step S10.

To make the system for preventing an accident 1 operate effectively, the warning device 60 is preferably activated before a railway vehicle comes to a platform. Accordingly, the system for preventing an accident 1 preferably starts to monitor the presence or absence of an object (person or animal) when a vehicle is about to enter a danger area for a person, etc. In this regard, determination of a just-approaching area is effective.

The just-approaching area may be specified manually from the terminal 70 by an administrator or automatically from the image analysis function by the control unit 30.

Figure 4:
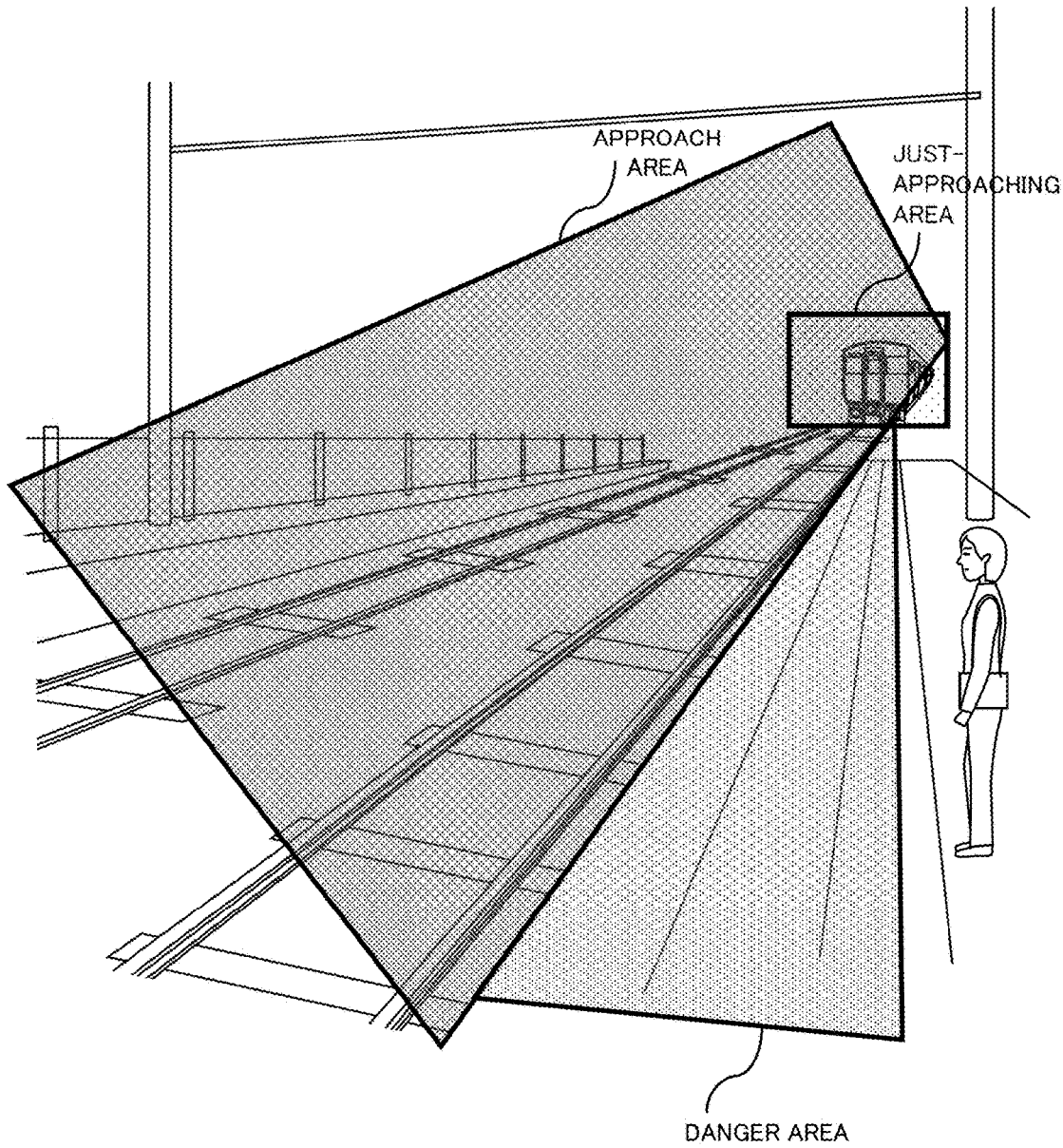
FIG. 4 shows a pattern diagram illustrating how to specify a just-approaching area from an image taken by the imaging device 10.

How to specify a just-approaching area will be described with reference to FIG. 4.

A vehicle comes to along the approach area in an approximately linear manner in an image taken by the imaging device 10. Accordingly, the front image of the vehicle is gradually enlarged as it approaches the danger area from the approach area, specifically a distance away from the danger area.

As described above, the imaging device 10 preferably has a function such as a continuous shooting function or a moving shooting function that is capable to measure the approaching speed of a vehicle from an image. The use of these functions store two or more images of the front of a vehicle as image data 53 and determines the area where the vehicle looks small before the front image of the vehicle is gradually enlarged as a just-approaching area.

The just-approaching area is preferably determined based on the speed at which a vehicle enters the approach area.

For example, if the speed at which a railway vehicle comes to a platform is 40 km per hour, the braking distance of the railway vehicle (the moving distance of the railway vehicle after the brakes are hit before the vehicle stops) is about 50 m. In this case, to add a safety margin, the area where the railway vehicle is present in the image data 53 taken at a point about 100 m from a platform where the railway vehicle approaches is preferably determined as a just-approaching area.

For another example, if the speed at which a railway vehicle comes to a platform is 60 km per hour, the braking distance of the railway vehicle is about 110 m. In this case, to add a safety margin, the area where the railway vehicle is present in the image data 53 taken at a point about 200 m from a platform where the railway vehicle approaches is preferably determined as a just-approaching area.

The just-approaching area is stored in the area table 51 of the memory unit 50. The just-approaching area is determined in the same way as the approach area and the danger area.

The size of the just-approaching area is preferably stored in the area table 51 of the memory unit 50.

Step S12: Checking the Location of a Vehicle, Part 1

The control unit 30 of the monitor server 20 executes the time period judgment module 33 to judge whether or not a vehicle enters the approach area.

To judge whether or not a vehicle enters the approach area, the control unit 30 judges whether or not it is a time period when a vehicle enters the approach area by referring to the time schedule table stored in the memory unit 50.

FIG. 5 shows an example of the time schedule table. For example, the time schedule table stores the type of a railway vehicle that comes to a station (e.g., local, rapid, express, limited express, freight), the arrival time, the departure time, the approaching speed to the platform, and remarks (e.g., passing without stop at the station).

For example, to add a safety margin, the time period from one minute before the arrival time to one minute after the departure time can be determined as the time period when a vehicle enters the approach area.

When the vehicle schedule is disrupted, the vehicle may not enter the approach area during the time period from one minute before the arrival time to one minute after the departure time. On the other hand, the vehicle may enter the approach area not during the time period from one minute before the arrival time to one minute after the departure time.

To prevent the operation error of the system for preventing an accident 1 that is caused by the disruption of a vehicle schedule, the control unit 30 of the monitor server 20 further executes the first judgment module 34 to determine whether or not a vehicle enters the approach area based on the images continuously shot by the imaging device 10.

How to judge whether or not a vehicle enters the approach area by executing the first judgment module 34 will be described below, for example.

As described above, the front image of the vehicle is gradually enlarged as it approaches the danger area from the approach area, specifically a distance away from the danger area.

The control unit 30 extracts the shape of the railway vehicle by using an image analysis function and calculates the size of the area that the railway vehicle covers in the image taken by the imaging device 10. Then, the control unit 30 refers to the area table 51 stored in the memory unit 50 and compares the size that the railway vehicle covers with the size of the just-approaching area. If the area that the railway vehicle covers is the size of the just-approaching area or more, the control unit 30 judges that a vehicle enters in the approach area. On the other hand, if the area that the railway vehicle covers is less than the size of the just-approaching area, the control unit 30 judges that the vehicle does not enter in the approach area.

If the result of the judgement in the step S12 is YES (if a vehicle enters the approach area), the control unit 30 passes processing to the step S13. If the result of the judgement in the step S12 is NO (if a vehicle does not enter the approach area), the control unit 30 passes processing to the step S16.

Step S13: Turning on the Approaching Flag

The control unit 30 of the monitor server 20 turns on the approaching flag. The approaching flag is to distinguish whether or not a vehicle in an approach area.

Step S14: Checking the Location of a Person or the Like

The control unit 30 of the monitor server 20 executes the second judgment module 35 to determine whether or not a person and/or an animal enters the approach area and/or the danger area based on the images continuously shot by the imaging device 10.

How to judge whether or not a person enters the approach area and/or the danger area will be described below, for example.

The control unit 30 extracts the shape of a person, etc., by using the image analysis function and sets location information on the area that the person, etc., covers in the image taken by the imaging device 10. The location information is determined in the same way as the approach area and the danger area. Then, the control unit 30 refers to the area table 51 stored in the memory unit 50 and judges whether or not at least a part of the area that the person, etc., covers overlaps the approach area and/or the danger area. If at least a part of the area that the person, etc., covers overlaps the approach area and/or the danger area, the control unit 30 judges that a person, etc., enters the approach area and/or the danger area. On the other hand, if at least a part of the area that the person, etc., covers does not overlap the approach area and/or the danger area, the control unit 30 judges that a person, etc., does not enter the approach area and/or the danger area.

If the result of the judgement in the step S14 is YES (if a person, etc., enters the approach area and/or the danger area), the control unit 30 passes processing to the step S15. If the result of the judgement in the step S14 is NO (if a person, etc., does not enter the approach area and/or the danger area), the control unit 30 passes processing to the step S12.

Step S15: Instructing Warning

The control unit 30 of the monitor server 20 instructs the warning device 60 to output warning information through the communication unit 40. When the processing of the step S15 ends, the control unit 30 of the monitor server 20 passes processing to the step S12.

Step S16: Checking the Location of a Vehicle 2, Part 2

The step S16 is executed if the control unit 30 judges that a vehicle does not enter the approach area in the step S12. In this case, a vehicle has not approached the danger area yet, or a vehicle was approaching the danger area but then has gone away.

In the former case, the approaching flag is set to off. On the other hand, in the latter case, the approaching flag is set to on. In the latter case, the sizes of the danger area and the just-approaching area are also preferably changed depending on the speed at which the next vehicle enters the approach area.

The control unit 30 judges whether or not the approaching flag is on in the step S16. If the result is YES (the approaching flag is on), the control unit 30 passes processing to the step S17. If the result is NO (the approaching flag is off), the control unit 30 passes processing to the step S12.

Step S18: Changing the Danger Area and the Just-Approaching Area

As described above, the sizes of the danger area and the just-approaching area are also preferably changed depending on the speed at which the next vehicle enters the approach area.

For example, if the next railway vehicle is a limited express train and passes through a station where an imaging device 10 is placed, the speed at which the railway vehicle comes to the platform is preferably estimated quickly.

For example, if the speed at which a railway vehicle comes to the platform is 80 km per hour, the braking distance of the railway vehicle is about 200 m. In this case, to add a safety margin, a larger danger area is determined and the area where the railway vehicle is present in the image data 53 taken at a point about 300 m from a platform where the railway vehicle approaches is preferably determined as a just-approaching area.

For another example, if the speed at which a railway vehicle comes to the platform is 100 km per hour, the braking distance of the railway vehicle is about 300 m. In this case, to add a safety margin, a larger danger area is determined and the area where the railway vehicle is present in the image data 53 taken at a point about 500 m from a platform where the railway vehicle approaches is preferably determined as a just-approaching area.

In the step S18, the control unit 30 of the monitor server 20 executes the danger area change module 37 to change the sizes of the danger area and the just-approaching area depending on the speed at which a vehicle enters the approach area. The speed at which a vehicle enters the approach area can be determined by referring to the time schedule table 52 stored in the memory unit 50. The sizes of the areas are changed in the same way as described in "Step S10: Receiving an area" and "Step S11: Determining a just-approaching area."

When the processing of the step S18 ends, the control unit 30 of the monitor server 20 passes processing to the step S12.

Operation and Working-Effect of the Present Invention

According to the present invention described in this embodiment, the operation of the area receiving module 31 receives input of an approach area as an area where a vehicle approaches and a danger area as an area where is danger from an approaching vehicle based on an image. Then, the operation of the time period judgment module 33 judges whether or not it is a time period when a vehicle enters the approach area by referring to the schedule of the vehicle. The operation of the second judgment module 35 judges whether or not a person, etc., enters the input approach area and/or danger area if a vehicle enters the approach area. Then, the warning module 36 provides warning information if a person, etc., enters the approach area and/or the danger area.

Accordingly, establishment of the standards of an approach area and a danger area in an image taken by the imaging unit 10 through the input that the area receiving module 31 can fix one or two places to be imaged to minimize the number of devices (the imaging device 10 in this embodiment) that monitor the presence or absence of an object (person and/or animal). Furthermore, since the control unit 30 of the monitor server 20 executes the second judgement module 35 to judge whether or not a person, etc., enters the approach area and/or the danger area if a vehicle enters the approach area, and the warning unit provides warning based on the judgment result from the second judgment unit 35, the accident in which a vehicle collides with an object (person or animal) can be prevented.

Therefore, the present invention can provide a system for preventing an accident 1 that is capable to minimize the number of devices that monitor the presence or absence of an object and maximize the effectiveness in preventing a collision accident and consequently reduce the work and cost burdens.

Furthermore, according to the present invention described in this embodiment, the control unit 30 executes the first judgment module 34 to judge whether or not a vehicle enters the approach area based on an image taken by the imaging device 10. Then, the control unit 30 executes the second judgment module 35 if judging that a vehicle enters the approach area.

Accordingly, the control unit 30 can judge whether or not a person, etc., enters the approach area and/or the danger area if a vehicle actually enters the approach area. Therefore, the operation error of the control unit 30 that is caused by the disruption of the vehicle schedule can be prevented.

Furthermore, according to the present invention described in this embodiment, the control unit 30 executes the approach area determination module 32 to determine a just-approaching area based on an image taken in an early stage of when a vehicle approaches.

Accordingly, the just-approaching area can be surely determined within an area where a vehicle is about to enter a danger area for a person, etc. Specifically, the warning unit 60 can provide warning information before the whole of a vehicle enters a danger area for a person, etc. Therefore, the present invention described in this embodiment can further enhance the effectiveness in preventing a collision accident even if the number of devices that monitor the presence or absence of an object is minimized.

Furthermore, according to the present invention described in this embodiment, the control unit 30 executes the approach area determination module 32 to determine a just-approaching area depending on the speed at which a vehicle enters the approach area.

Accordingly, the just-approaching area can be determined in an earlier stage if the speed at which a vehicle enters the approach area is high. As the result, the warning unit 60 can be prevented from providing warning information after the whole of a vehicle enters the danger area for a person, etc., because of the high speed at which the vehicle enters the approach area.

Furthermore, the just-approaching area can be determined in a later stage if the speed at which a vehicle enters the approach area is low. As the result, the warning unit 60 can be prevented from providing false information because a vehicle is about to approach the just-approaching area but actually is not in the danger area for a person, etc.

Therefore, the present invention described in this embodiment can further improve the accuracy of warning information provided from the warning unit 60 even if the number of devices that monitor the presence or absence of an object is minimized.

Furthermore, according to the present invention described in this embodiment, the control unit 30 executes the danger area change module 37 to change the sizes of the danger area and the just-approaching area received by execution of the area receiving module 31 depending on the speed at which a vehicle enters the approach area.

Accordingly, the danger area and the just-approaching area can be changed to a large area if a vehicle that has a higher speed than any other vehicles that have entered the approach area enters the approach area. As the result, the warning unit can be prevented from providing warning information after the whole of a vehicle enters the danger area for a person, etc., because of the high speed at which the vehicle enters the approach area.

Furthermore, the danger area and the just-approaching area can be changed to a smaller area if a vehicle that has a lower speed than any other vehicles that have entered the approach area enters the approach area. As the result, the warning unit can be prevented from providing false information because the vehicle approaches around the danger area but actually is not in the danger area for a person, etc.

Therefore, the present invention described in this embodiment can further improve the accuracy of warning information provided from the warning unit 60 even if the number of devices that monitor the presence or absence of an object is minimized.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for preventing an accident
10 Imaging device
20 Monitor server
30 Control unit
31 Area receiving module
32 Approach area determination module
33 Time period judgment module
34 First judgment module
35 Second judgment module
36 Warning module
37 Danger area change module
40 Communication unit
50 Memory unit
51 Area table
52 Image data
60 Warning device
70 Terminal

What is claimed is:

1. A system for preventing an accident, comprising:
an area receiving unit that receives input of an approach area as an area where a vehicle approaches and a danger area as an area where is danger from an approaching vehicle based on an image;
a first judgment unit that judges whether or not the vehicle enters the approach area based on an image;
a time period judgment unit that judges whether or not it is a time period when the vehicle enters the approach area by referring to the schedule of the vehicle;
a second judgment unit that judges whether or not a person and/or an animal enters the approach area and/or the danger area if the first judgment unit that judges that the vehicle enters the approach area and the time period judgment unit judges that it is a time period when the vehicle enters the approach area;

a warning unit that provides warning information if the second judgment unit judges that a person and/or an animal enters the approach area and/or the danger area; and a determination unit that determines a just-approaching area as an area where the vehicle enters in an early stage within the approach area, wherein the first judgment unit judges whether or not the vehicle enters the just-approaching area to judge that the vehicle enters the approach area, and wherein the determination unit determines the just-approaching area based on the speed at which the vehicle enters the approach area.

2. The system according to claim 1, wherein the determination unit determines the just-approaching area from an image taken in an early stage of when the vehicle enters.

3. The system according to claim 1, further comprising a danger area change unit that changes the danger area that the area receiving unit received based on the speed at which the vehicle enters the approach area.

4. A method for preventing an accident, comprising the steps of:

receiving input of an approach area as an area where a vehicle approaches and a danger area as an area where is danger from an approaching vehicle based on an image;

judging whether or not the vehicle enters the approach area based on an image;

judging whether or not it is a time period when the vehicle enters the approach area by referring to the schedule of the vehicle;

judging whether or not a person and/or an animal enters the approach area and/or the danger area if judging that the vehicle enters the approach area and judging that it is a time period when the vehicle enters the approach area;

providing warning information if judging that a person and/or an animal enters the approach area and/or the danger area;

determining a just-approaching area as an area where the vehicle enters in an early stage within the approach area, wherein determining the just-approaching area includes determining the just-approaching area based on the speed at which the vehicle enters the approach area; and judging whether or not the vehicle enters the just-approaching area to judge that the vehicle enters the approach area.

5. A computer program product for use in a system for preventing an accident, comprising a non-transitory computer usable medium having a set of instructions physically embodied therein, the set of instructions including computer readable program code, which when executed by the system causes an information processing unit to execute the steps of:

receiving input of an approach area as an area where a vehicle approaches and a danger area as an area where is danger from an approaching vehicle based on an image;

judging whether or not the vehicle enters the approach area based on an image;

judging whether or not it is a time period when the vehicle enters the approach area by referring to the schedule of the vehicle;

judging whether or not a person and/or an animal enters the approach area and/or the danger area if judging that the vehicle enters the approach area and judging that it is a time period when the vehicle enters the approach area;

providing warning information if judging that a person and/or an animal enters the approach area and/or the danger area;

determining a just-approaching area as an area where the vehicle enters in an early stage within the approach area, wherein determining the just-approaching area includes determining the just-approaching area based on the speed at which the vehicle enters the approach area; and judging whether or not the vehicle enters the just-approaching area to judge that the vehicle enters the approach area.

* * * * *